C. Roder.
Loom.
N°43,263  Patented Jun. 21, 1864.
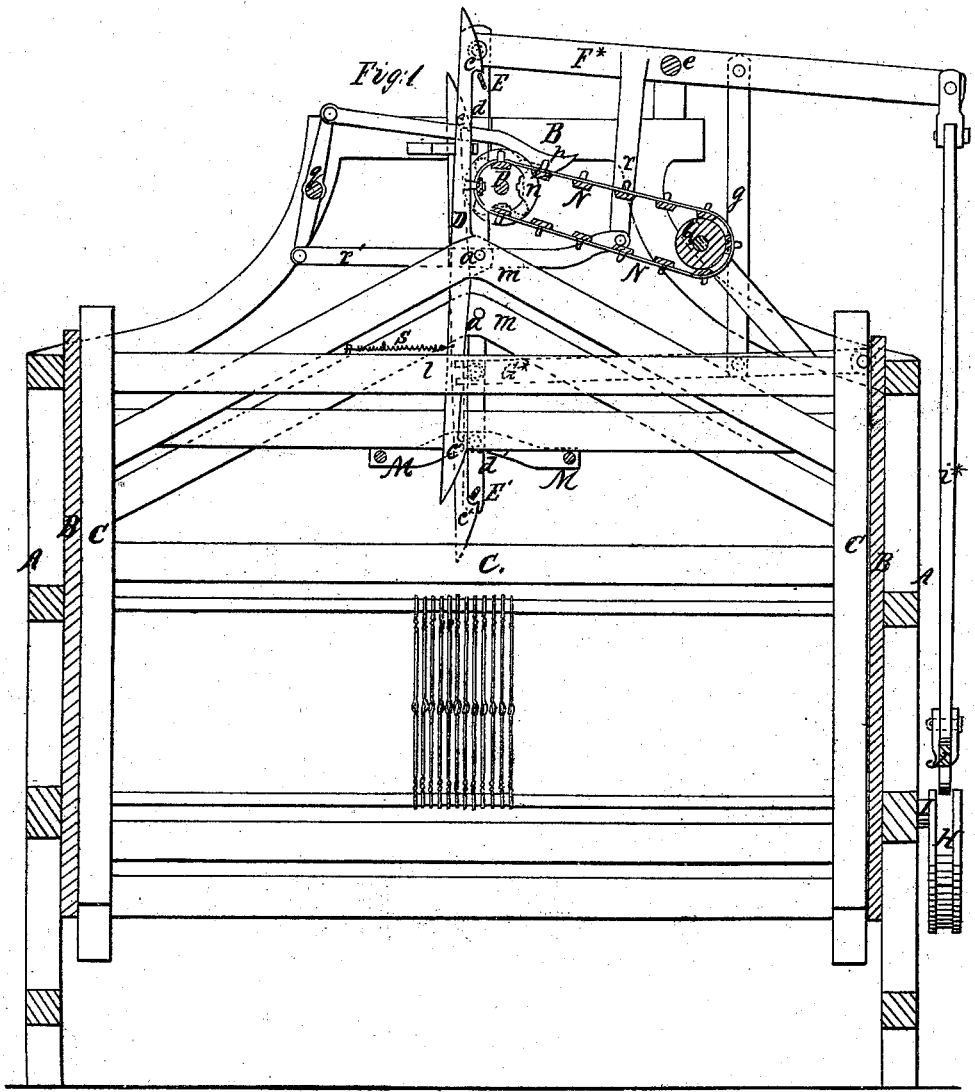
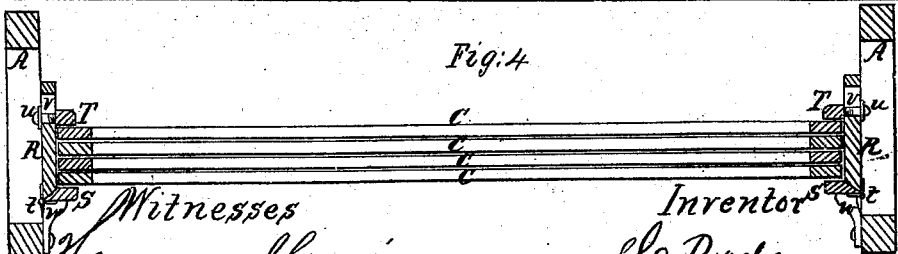

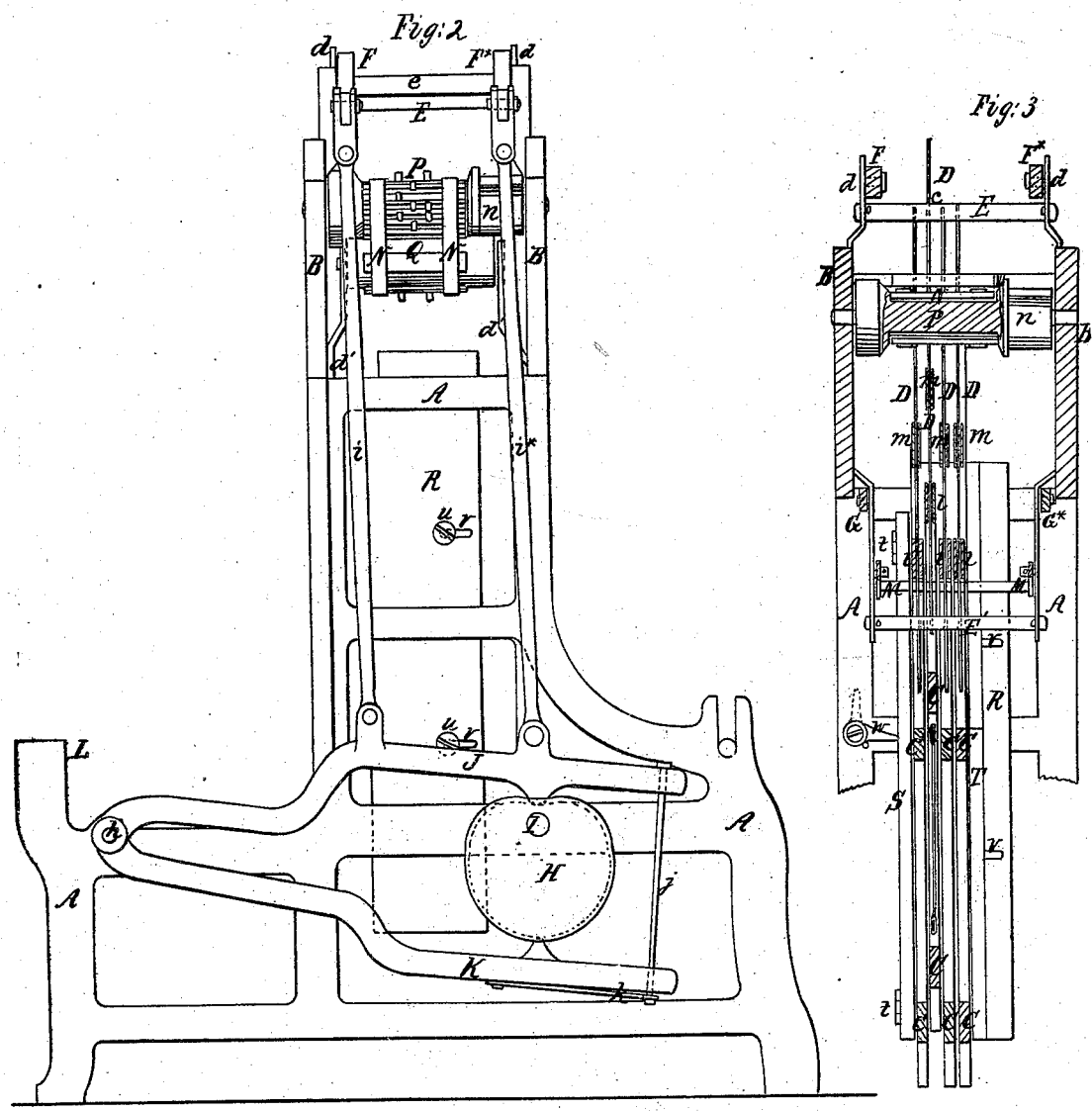

UNITED STATES PATENT OFFICE.

CONRAD RODER, OF CERALVO, KENTUCKY, ASSIGNOR TO HIMSELF AND KONRAD FROEHLICK, OF PHILADELPHIA, PENNSYLVANIA.

IMPROVEMENT IN POWER-LOOMS.

Specification forming part of Letters Patent No. 43,263, dated June 21, 1864.

*To all whom it may concern:*

Be it known that I, CONRAD RODER, of Ceralvo, in the county of Ohio and State of Kentucky, have invented certain new and useful Improvements in the Harness-Motion of Power-Looms; and I do hereby declare that the following is a full, clear, and exact description of the same, reference being had to the accompanying drawings, in which—

Figure 1 is a vertical section of the loom at right angles to the warp. Fig. 2 is a side view of the same. Fig. 3 is a vertical section of the same parallel with Fig. 1. Fig. 4 is a horizontal section of the harness.

Similar letters of reference indicate corresponding parts in the several figures.

This invention consists in a novel arrangement of or mode of applying the mechanism for operating the harness in that class of looms in which the space below the heddle-frames is left entirely clear, and any number of leaves of harness are enabled to be operated entirely from above, and the harness-motion, when several leaves are used, is much simplified.

It also consists in a novel system of guides for the heddle-frames, whereby provision is made for the guiding of a greater or less number of frames, as may be required, and whereby any swinging of the harness either back and forth, or laterally, is effectually prevented.

To enable others skilled in the art to make and use my invention, I will proceed to describe its construction and operation.

A is the main frame of the loom, and B the top frame, which supports the harness and the principal portion of the harness-motion.

C C are the harness or heddle-frames, each having attached to its upper part a double hook D. This hook is attached at the middle of its length to the frame C by means of a pin, *a*, upon which it is free to oscillate, the said pin being about midway between the two teeth or catches *c c'* of the hook, and arranged directly over the center of the frame C, and in order to bring the hooks high enough the said pin is not inserted in the heddle-frame proper but in a double diagonal brace or yoke, *m*, secured to the upper part of the said frame.

E E' are the knives or lifting-bars, which act upon the teeth or catches *c c'* of the hooks D D for the purpose of raising and depressing their respective heddle-frames. The upper knife, E, has its ends secured to two guide-rods, *d d*, which are fitted to slide vertically in guide-grooves in the top frame, B, and the lower knife, E', has its end secured to two guide-rods, *d' d'*, working in line with *d d* in the same or similar guide-grooves. The rods *d d* are suspended from two levers, F F*, of the first order, which are arranged transversely to the warp on a fixed fulcrum, *e*, at the top of the frame B, and the rods *d' d'* are attached to two levers, G G*, of the third order, which work on fulcrum-pins *f*, secured in the frame B, and the levers G G* are connected by rods *g* with the levers F F* in such manner that by the movements of the four levers the knives E E' may be made to approach and recede from each other during every beat of the lay, one always rising as the other descends, and vice versa.

The movements of the several levers are obtained from a cam, H, arranged outside of the main frame of the loom on the cam-shaft I, and operating directly upon a pair of levers, J K, which work parallel with the side of the loom on a fixed fulcrum, *h*, arranged near the breast-beam L, and the upper one, J, of which is connected by two rods, *i i**, with the two levers F F*. The cam H works between the two levers J K, and the said levers are connected by a rod, *j*, and spring *k* in such manner as to form an expanding yoke in which the cam works without any lost motion. The back lever F*, being connected with the lever J at a greater distance from the fulcrum than the front lever F, is caused to have greater motion than the latter lever, and to give a greater motion to the back lever G* than F gives to the front lever G, and in this way the knives E E' are caused, as the upper one, E, rises and the lower one, E', descends, to assume sloping positions corresponding with the necessary slope of the open shed of the warp, and by this means the several heddle-frames are caused to be elevated or depressed greater or less distances, according to their respective distances from the breast-beam of the loom, and the shed is opened even all across the warp. The guide-rods *d d'*, which carry the lower knife, E', also carry, above the said knife, a balanced frame, M, for the support of those heddle-frames which are not lifted by the upper knife, the said frame M being arranged below an extra upper rail, $l$, with which every heddle-frame is furnished.

N is the pattern-chain, arranged directly over the heddles on two cylinders, P Q, arranged within the upper frame, B, the principal cylinder P being near the center of the loom, and in a position for the pattern-pins of the chain to act upon the hooks D D just below their upper catches, $c$ $c$. The cylinders and chain are rotated by the action of a pawl or dog, $p$, upon the toothed wheel $n$ at one end of the cylinder P. This dog $p$ is operated by being connected with one arm of a rock-shaft, $q$, which works in bearings in the frame B, and another arm of which is connected by a rod, $r'$, with an arm, $r$, secured rigidly to the lever F*. $s$ $s$ are springs applied to the hooks D D for the purpose of drawing their lower parts out of range of their respective knife E', and thereby forcing their upper ends toward the pattern cylinder and within range of the upper knife.

The hooks D D and knives E E' operate in combination with the pattern cylinder or chain in substantially the same manner as the similar hooks and knives arranged at the sides of other looms in connection with jacks above and below the harness—that is to say, the pins of the pattern-chain control the positions of the hooks so that they will be caught by the upper or lower knife, as may be required.

Those heddle-frames whose hooks are caught by the upper knife are lifted by the said knife in its ascent, and those which are not so caught are allowed to descend gradually by their own weight, their too sudden descent being prevented by the balance-frame M, which lowers them gradually, and the lower knife only operating upon the hooks to depress their respective heddle-frames in case of their sticking or failing to descend by gravitation. It will be understood that by this arrangement of the hooks and knives and pattern-chains the harness-motion is simplified by dispensing altogether with the jacks commonly used above and below the harness in combination with such hooks and knives, and by dispensing with the lower jacks the space below the heddle-frames, which it is difficult to reach for repair or adjustment, is left clear of all machinery.

R R are two guides composed of flat upright boards or plates secured one at each side of the harness to the interior of the main framing, parallel with the warp and at such distance apart as to permit the harness to work freely between them without swinging laterally. To the front edge of each of these boards or plates there is hinged, by hinges $t$ $t$, an upright narrow strip, S, of wood or metal, which is capable of lapping over a portion of one side of the front heddle-frame, as shown in Fig. 4, and so preventing it from swinging forward. In front of the said strips S S there are pivoted to the inside of the frame A buttons $w$ $w$, which serve to prevent the said strips from swinging forward upon their hinges and to hold them back into positions at right angles to the guides R R, as shown in Fig. 4, in which positions they abut firmly against the latter guides.

In rear of the heddle-frames there is attached to each board or plate R a strip, T, which laps over a portion of one side of the back heddle-frame. These strips are secured to the boards or plates R by screws $u$ $u$, passing through horizontal slots $v$ $v$ in the said boards or plates, and screwing into the edges of the said strips, the said slots permitting the adjustment of the said strips in a backward or forward direction; and the said strips are so adjusted, according to the number of heddle-frames to be used, that the several frames will slide easily up and down, as required, between them and the front strips, S S. Thus it will be seen that the strips S S and T T form guides to keep the heddle-frames from swinging back and forth.

To take out any of the heddle-frames or put in more at any time, the buttons $w$ $w$ are moved out of the way, as shown in red outline in Fig. 3, and the guide-strips S S swing forward on their hinges as shown in red outline in Fig. 4, out of the way of the frames.

In taking out or putting in more heddle-frames the back guide-strips, T T, require to be set farther forward or back, so that when the front strips, S S, are again closed over the front heddle-frame there will be just room enough between the strips S S and T T for the several frames to work freely.

What I claim as my invention, and desire to secure by Letters Patent, is—

1. The attachment of the hooks D D directly to the heddle-frame, substantially as and for the purpose herein specified.

2. The arrangement of the pattern-chain N, or its equivalent, the knives E E', and levers F F* and G G*, in combination with the heddle-frames and their directly-attached hooks D D, whereby the harness is operated entirely from above, substantially as herein specified.

3. The combination of the cam H, levers J K, rod $j$, spring $k$, and rods $i$ $i^*$, the whole arranged in connection with the levers F F*, to operate substantially as and for the purpose herein set forth.

4. The hinged guides S S and adjustable guides T T, in combination with each other and with the guides R R, for guiding the heddles, substantially as and for the purpose herein specified.

CONRAD RODER.

Witnesses:
GEO. W. REED,
HENRY MORRIS.